United States Patent
Gupta et al.

(10) Patent No.: US 10,635,717 B2
(45) Date of Patent: *Apr. 28, 2020

(54) QUERY SUGGESTION TEMPLATES

(71) Applicant: Google Inc., Mountain View, CA (US)

(72) Inventors: Nitin Gupta, Santa Clara, CA (US); Renshen Wang, Mountain View, CA (US); Mangesh Gupte, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/297,103

(22) Filed: Oct. 18, 2016

(65) Prior Publication Data

US 2017/0039209 A1 Feb. 9, 2017

Related U.S. Application Data

(63) Continuation of application No. 13/908,508, filed on Jun. 3, 2013, now Pat. No. 9,529,856.

(51) Int. Cl.
*G06F 16/9032* (2019.01)
*G06F 16/29* (2019.01)
*G06F 16/242* (2019.01)
*G06F 16/28* (2019.01)
(Continued)

(52) U.S. Cl.
CPC ...... *G06F 16/90324* (2019.01); *G06F 16/242* (2019.01); *G06F 16/24578* (2019.01); *G06F 16/285* (2019.01); *G06F 16/29* (2019.01); *G06F 17/248* (2013.01)

(58) Field of Classification Search
None
See application file for complete search history.

(56) References Cited

U.S. PATENT DOCUMENTS

| 7,774,003 B1 * | 8/2010 | Ortega | H04W 4/029 |
| | | | 455/456.2 |
| 9,146,939 B1 * | 9/2015 | Zhdanovich | G06F 16/532 |
| 9,201,945 B1 | 12/2015 | Garrett et al. | |

(Continued)

FOREIGN PATENT DOCUMENTS

| CN | 102625936 | 8/2012 |
| CN | 102859523 | 1/2013 |

(Continued)

OTHER PUBLICATIONS

Written Opinion of Singapore Patent Application No. 10201402781X dated Jun. 7, 2017.

(Continued)

*Primary Examiner* — Thu N Nguyen
(74) *Attorney, Agent, or Firm* — Middleton Reutlinger

(57) ABSTRACT

Methods and apparatus related to identifying a query template that includes one or more terms and a member of an entity category and ranking the query template. Query suggestions may be determined based on the query template. The ranking of the query template may be utilized to determine if the query template is a valid query template. The ranking of the template may be based on at least a count of occurrences of one or more of the entities of the entity category in past queries that conform to the query template.

19 Claims, 7 Drawing Sheets

(51) Int. Cl.
*G06F 16/2457* (2019.01)
*G06F 17/24* (2006.01)

(56) References Cited

U.S. PATENT DOCUMENTS

| | | | |
|---|---|---|---|
| 2005/0044491 A1* | 2/2005 | Peterson | G06F 17/2247 715/234 |
| 2007/0233864 A1* | 10/2007 | Xie | G06F 17/3087 709/226 |
| 2009/0106224 A1 | 4/2009 | Roulland et al. | |
| 2009/0112832 A1 | 4/2009 | Kandogan et al. | |
| 2009/0282010 A1* | 11/2009 | Vasudevan | G06F 16/367 |
| 2010/0094854 A1 | 4/2010 | Rouhani-Kalleh | |
| 2011/0246575 A1* | 10/2011 | Murayama | G06F 17/30011 709/204 |
| 2012/0130978 A1* | 5/2012 | Li | G06F 17/3064 707/706 |
| 2012/0265787 A1 | 10/2012 | Hsu et al. | |
| 2013/0036137 A1* | 2/2013 | Ollis | G06F 17/30864 707/771 |
| 2013/0117297 A1* | 5/2013 | Liu | G06F 17/3064 707/767 |
| 2013/0325839 A1* | 12/2013 | Goddard | G06F 17/30867 707/708 |

FOREIGN PATENT DOCUMENTS

| | | |
|---|---|---|
| CN | 102999496 | 3/2013 |
| TW | 201245987 | 11/2012 |

OTHER PUBLICATIONS

Search Report and Written Opinion of Singapore Patent Application No. 10201402781X dated Aug. 2, 2016.
State Intellectual Property Office of the People's Republic of China; Office Action in Application No. 201410241761.6 dated May 29, 2018; 34 pages.
Taiwan Intellectual Property Office; Office Action issued in Application No. 103119025 dated Jul. 4, 2018; 15 pages.
Singapore Patent Office; Written Opinion issued in Application No. 10201402781X dated Apr. 30, 2018.
Singapore Patent Office; Notice of Grant issued in Application No. 10201402781X dated Dec. 6, 2018.
Chinese Patent Office; Notice of Grant issued in Application No. 201410241761.6 dated May 14, 2019.

* cited by examiner

QUERY SUGGESTION TEMPLATES

BACKGROUND

This specification is directed generally to determining query suggestion templates to utilize in determining query suggestions to provide to users.

Information retrieval systems, such as Internet search engines, enable users to locate information in a large database. For example, Internet search engines enable users to access information such as web pages, images, text documents, and/or multimedia content in response to a search query submitted by a user consisting of one or more search terms.

Some information retrieval systems may provide one or more query suggestions to a user as the user is typing a query and/or after a user has submitted a query. The user may choose one of the query suggestions to utilize as a submitted query and/or to utilize as the basis for a submitted query (e.g., by modifying, adding to, and/or subtracting from the selected query suggestion). The query suggestions are often generated via past user queries and/or generated automatically.

SUMMARY

The present disclosure is directed to methods and apparatus for determining a query template utilizing one or more database of entities, such as a knowledge graph. A plurality of queries conforming to a template are identified, wherein each of the queries includes at least one term that is a member of an entity category and also includes one or more terms that match terms in the other identified queries. A query template is constructed that includes the matching terms and the entity category. A ranking of the query template may be determined and may be indicative of the likelihood that the query template is effective in determining query suggestions to provide to a user in response to future partial queries.

In some implementations, a computer implemented method is provided that includes the steps of: identifying an entity category, wherein the entity category is a grouping of entities that share one or more aspects in common; identifying entity aliases, each of the entity aliases associated with at least one of the entities in the entity category; identifying a query template, wherein the query template includes one or more template terms and an identifier of the entity category; determining a group of queries that conform to the query template, wherein each of the queries in the group of queries includes one of the identified entity aliases and one or more terms matching the template terms; and determining a ranking for the query template, wherein the ranking is based on at least a count of occurrences of one or more of the entities of the entity category in the group of queries that conform to the query template.

This method and other implementations of technology disclosed herein may each optionally include one or more of the following features.

The method may further include the step of determining if the query template is valid based on whether the ranking satisfies a threshold.

The count of occurrences of one or more of the entities of the entity category in the group of queries that conform to the query template may be based on a number of conforming entity category members, wherein the conforming entity category members are the entities that are in the entity category and present in the group of queries that conform to the query template. In some of those implementations, determining the ranking for the query template may include: comparing the number of conforming entity category members to a number of entity category members, wherein the number of entity category members is based on the number of the entities that are in the entity category.

The count of occurrences of one or more of the entities of the entity category in the group of queries that conform to the query template may be based on a conforming frequency of occurrence for multiple of the entities, wherein each conforming frequency of occurrence may be based on the frequency of occurrence of one of the entities in the group of queries that conform to the query template. In some of those implementations, determining the ranking for the query template may include: comparing the conforming frequency of occurrences to frequency of occurrences of the multiple entities of the entity category in an additional group of queries, wherein the additional group of queries includes queries that fail to conform to the query template.

The count of occurrences may be based on the number of past queries that conform to the query template. The ranking may be further determined based on similarity between members of the entities of the entity category. The category term may be a prefix of the query template. The one or more terms matching the template terms may include one or more terms that are not present in the query template.

In some implementations, a computer implemented method is provided that includes the steps of: identifying a partial query; identifying a query template based on the partial query, wherein the query template includes one or more template terms and an identifier of an entity category, and wherein the entity category is a grouping of entities that share one or more aspects in common; and providing at least one query suggestion based on the query template, wherein the provided query suggestion includes the one or more template terms and an entity alias of one of the entities.

This method and other implementations of technology disclosed herein may each optionally include one or more of the following features.

The entity alias may be identified based on the partial query. The entity alias may be identified based on the location of the user. The query suggestion may be identified based on a popularity measure associated with the entity that is associated with the entity alias. Identifying the query template may further include determining whether one or more terms in the partial query match one or more terms in the query template. The query template may be identified based on a ranking of the query template.

Identifying the query template may further include the steps of: determining an entity category based on the partial query; and determining the query template based on the determined entity category. In some of those implementations, determining the entity category based on the partial query may include: determining a partial query entity based on one or more partial query terms of the partial query; and determining the entity category based on the partial query entity. In some of those implementations, the method may further include the step of determining additional characters in the partial query that are in addition to the partial query terms utilized to determine the partial query entity, wherein determining the query template is further based on the additional characters.

The method may further include the step of determining a ranking of the query suggestion based on a popularity measure associated with the entity associated with the entity alias.

The method may further include the step of determining a ranking of the query suggestion based on a ranking associated with the entity template.

Other implementations may include a non-transitory computer readable storage medium storing instructions executable by a processor to perform a method such as one or more of the methods described herein. Yet another implementation may include a system including memory and one or more processors operable to execute instructions, stored in the memory, to perform a method such as one or more of the methods described herein.

Particular implementations of the subject matter described herein determine a query template and/or ranking associated with the query template, based on identifying, from a group of queries, queries that have one or more matching terms and have one or more terms that are members of an entity category of terms. In some implementations, the ranking of the query template may be determined based on the number of previously entered queries in a set of queries that conform to the query template. In some implementations, the ranking of the query template may be determined based on the number of known entities from the entity category that are present in conforming queries. In some implementations, the ranking of the query template may be determined based on the distribution of members of the entity category in queries that conform to the query template and the distribution of members of the entity category in a group of queries that includes queries that do not conform to the query template. The query template and the ranking of the query template represent a new query template that may be derived from one or more queries, such as previously submitted queries of a user. The query template may be utilized to provide a user with one or more query suggestions for partial queries that conform to the query template.

It should be appreciated that all combinations of the foregoing concepts and additional concepts discussed in greater detail herein are contemplated as being part of the inventive subject matter disclosed herein. For example, all combinations of claimed subject matter appearing at the end of this disclosure are contemplated as being part of the inventive subject matter disclosed herein.

DETAILED DESCRIPTION

Figure 1:
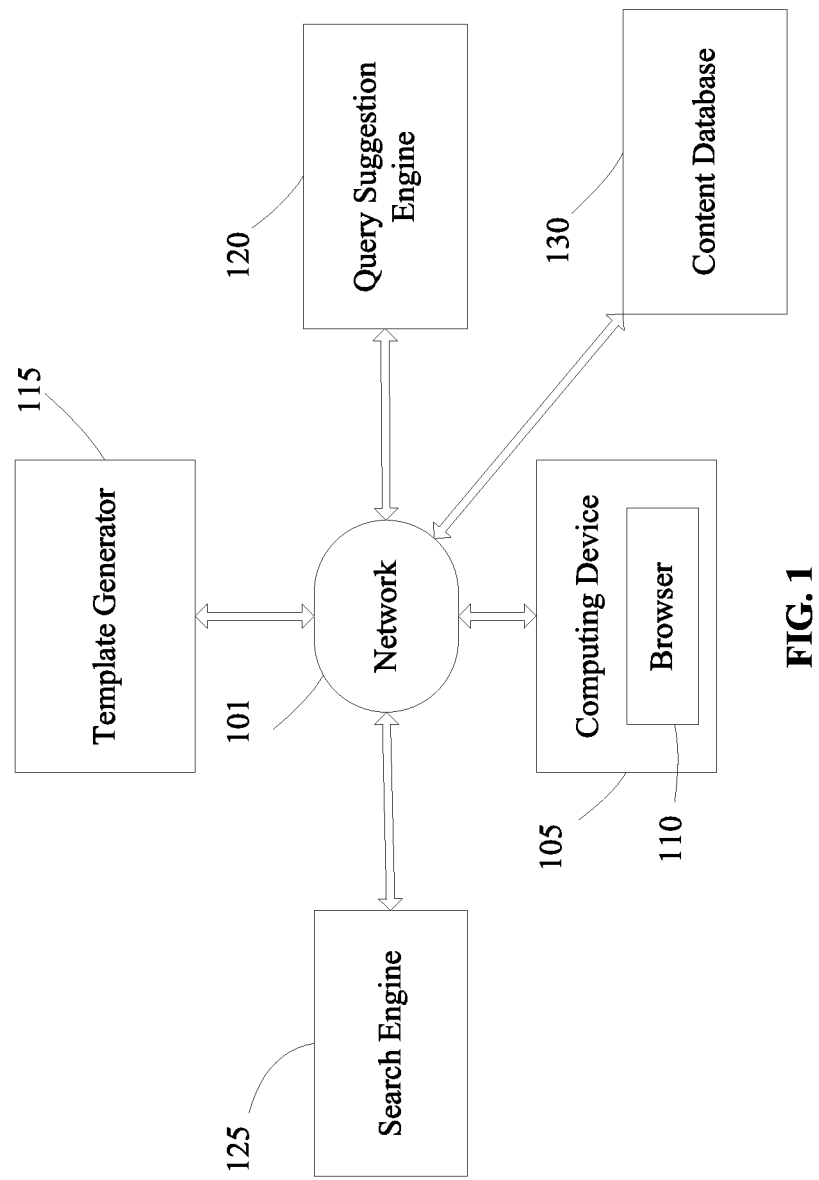
FIG. 1 is a block diagram of an example environment in which a method to determine and rank a query template may be implemented.

Users may submit multiple queries, each of the queries including one or more terms that match terms in other of the queries, and one or more terms that are associated with an entity category. For example, the search query phrase "restaurants in" may be included in a number of submitted queries, followed by the name of a city associated with the entity category of "city". The submitted queries may include, for example "restaurants in San Francisco," "restaurants in LA," and "restaurants in Los Angeles." The entity category of "city" may include multiple entities, each entity being associated with a particular city and being associated with one or more aliases. For example, the entity associated with the city of San Francisco in California may be associated with aliases such as, for example, "San Francisco", "SF", and "SFO". The aliases associated with the entities of the entity category may be utilized as the terms that are associated with the entity category. Also, for example, a search query phrase "beaches in" may be included in a number of submitted queries, followed by the name of a city associated with the entity category of "beach cities". The entity category of "beach cities" may be a different grouping of entities than the entity category of "city", such as a grouping of entities that are associated with coastal cities. For example, the entity associated with the city Las Vegas in Nevada may be included in a general "city" entity category, but may not be included in the "coastal cities" entity category.

One or more queries in a group of queries, such as a group of queries that have been previously submitted by one or more users, may be utilized to determine a query template to which multiple queries may conform. The query template includes one or more terms and an identifier of a category of terms. For example, a query template may be "restaurants in [city]", wherein "[city]" is an identifier of one or more terms that are associated with the entity category of "city". The query template may be ranked based on a determination of the usefulness of the query template. The ranking of a query template may be utilized to determine if the template is a valid template. The ranking of a query template may additionally and/or alternatively be associated with the template and utilized in determining whether to utilize a query template in forming a query suggestion and/or in determining a ranking of a query suggestion formed based on the query template.

For example, a user may input a partial query "restaurants in s" and the query template "restaurants in [city]" may be identified as a query template for the entered partial query based on, for example, the common terms of the template and the entered partial query. In some implementations the query template "restaurants in [city]" may have been determined based on techniques described herein and the query template may have been determined to be a valid query template based on techniques described herein. One or more query suggestions for the partial query may be formed based on the query template. For example, a query suggestion formed based on the query template may include the query suggestion "restaurants in San Francisco", which may be formed based on selection of "San Francisco" from the terms that are associated with the entity category of "city". In some implementations, the query suggestion may only be formed if a ranking of the query template satisfies a threshold. For example, the threshold may be based on rankings associated with other query suggestions associated with "restaurants in s". For example, a query suggestion may only be formed for a partial query based on a query template if other query suggestions for the partial query are not considered highly ranked query suggestions relative to the query suggestion. The formed query suggestion "restaurants in San Francisco" may then be selected to provide to a user as a query suggestion for the partial query. A ranking of the query suggestion "restaurants in San Francisco" may optionally be determined and utilized in determining whether to select the query suggestion to provide to the user and/or where to present the query suggestion in providing it to the user. The ranking may be based on, for example, a ranking associated with the alias "San Francisco", a ranking associated with the entity associated with the city of San Francisco, and/or the ranking optionally associated with the query template "restaurants in [city]".

Throughout this specification, one or more terms surrounded by square brackets will be used to denote an identifier of a category of terms associated with an entity category and/or the entity category itself. For example, "[city]" denotes an identifier of a category of terms associated with an entity category of "city". For example, the queries "restaurants in San Francisco," "restaurants in New York," and "restaurants in Denver" may be referenced as conforming to the query template "restaurants in [city]". As discussed herein, a query template that includes [city] may be utilized to form a plurality of query suggestions that replace the identifier [city] with one or more terms from the category of terms such as the city aliases of "San Francisco", "New York", and/or "Denver". For example, the query template "restaurants in [city]" may be utilized to form the query suggestions "restaurants in San Francisco", "restaurants in New York", and "restaurants in Denver".

Referring to FIG. 1, a block diagram is illustrated of an example environment in which a method to determine and rank a query template may be implemented. The environment includes a computing device 105 with a browser 110, a template generator 115, a query suggestion engine 120, a search engine 125, and a content database 130. The environment also includes a communication network 101 that enables communication between various components of the environment.

In some implementations, a user may interact with the search engine 125 through a web browser 110 on a client computing device 105. The computing device 105 may be, for example, a desktop computer, a laptop computer, a cellular phone, a smartphone, a personal digital assistant (PDA), a tablet computer, a wearable computing device (e.g., a digital watch, earpiece, glasses), a navigation system, and/or another computing device. The computing device 105 and the search engine 125 each include memory for storage of data and software applications, a processor for accessing data and executing applications, and components that facilitate communication over a communication network 101. The operations performed by the computing device 105, the browser 110, and/or the search engine 125 may be distributed across multiple computer systems.

The search engine 125 receives a query and executes the query against a search engine content database (e.g., content database 130) of available documents such as web pages, images, text documents, and/or multimedia. For the purposes of this specification, a document is any data that is associated with a document address. Documents include webpages, word processing documents, portable document format (PDF) documents, images, video, audio, e-mails, calendar entries, task entries, and feed sources, to name just a few. The documents may include content such as, for example, words, phrases, pictures, audio, task identifiers, entity identifiers, etc.; embedded information (such as meta information and/or hyperlinks); and/or embedded instructions (such as JavaScript scripts). The search engine 125 identifies content that matches the submitted query and responds by generating search results that are transmitted to one or more devices in a form that is useful for the devices. For example, in response to a query from the computing device 105, the search engine 125 may transmit a plurality of search results to be displayed in the web browser 110 that is executing on the computing device 105. The content database 130 may include one or more storage mediums. For example, in some implementations the content database 130 may include multiple computer servers each containing one or more storage mediums.

Applications executing on the computing device 105 may also provide partial queries being formulated by users before the users have indicated completion of the queries. The applications may be, for example, a web browser 110, a toolbar running in the web browser 110, an email application, a text messaging application, and/or a search client running on the computing device 105. In some implementations, the applications provide each character of the query as it is typed or otherwise entered by the user. In some implementations, the applications provide multiple characters at a time, optionally following a pause by the user between character entries.

A partial query is a query formulated by a user prior to an indication by the user that the query is a completed query. In some implementations, a user may indicate a completed query by entering a carriage return and/or other character. In some implementations, a user may indicate a completed query by selecting a search button or other submission button in a user interface presented to the user. In some implementations, a user may indicate a completed query by speaking a command in a speech user interface. In some implementations, a user may indicate a completed query by pausing more than a predetermined amount of time during entering of the query. Other forms of providing a partial query and/or indicating a completed query may additionally and/or alternatively be utilized.

In response to a partial query entered by a user, the computing device 105 may facilitate entry of user input by providing suggested inputs to the user. For example, when the user enters one or more characters, the computing device 105 can provide query suggestions that are selected using the one or more characters. In some implementations, the query suggestions may be provided to the computing device 105 by query suggestion engine 120. The query suggestions that are provided may include words or phrases that include the one or more characters that were entered by the user. For example, complete words or extended phrases can be suggested for partial words or partial phrases that a user has entered (e.g., spoken or entered using a physical or virtual keyboard). The query suggestions can also include words or phrases that are similar to (e.g., synonyms or spelling corrections of) the user input. One or more of the query suggestions may include query suggestions that are determined based on a query template as described herein. The user can interact with (e.g., tap, click, or otherwise affirmatively select) one of the provided query suggestions to enter the text of the selected query suggestion.

The query suggestions may be displayed to a user in a user interface of the computing device 105. For example, the query suggestions may be displayed within a cascaded drop down menu of the search field of an application, such as a web browser executing on the computing device 105, as the user is typing the query.

In some implementations, in response to a partial query being entered at computing device 105, the search engine 125 may receive the partial query and forward the partial query to the query suggestion engine 120. In some implementations, in response to a partial query being entered at computing device 105, the one or more applications executing on the computing device 105 may optionally directly forward the partial query to the query suggestion engine 120. The query suggestion engine 120 may include memory for storage of data and software applications, a processor for accessing data and executing applications, and components that facilitate communication over the communication network 101. The query suggestion engine 120 may match a submitted partial query to one or more of a plurality of query suggestions that are an appropriate match to the query. For example, the query suggestion engine 120 may match a submitted query to a query template and utilize the query template to determine one or more query suggestion that are an appropriate match to the query. Also, for example, the query suggestion engine 120 may match a submitted query to a query suggestion that was formed utilizing a query template. In some implementations, the query suggestions may represent potential completed queries that may be provided to a user to enable the user to choose one of the query suggestions as a basis for utilization in a search or other information retrieval application.

In some implementations a query suggestion database may include one or more query suggestions and/or query templates that may be utilized to determine query suggestions. Such query suggestions and/or query suggestion templates in a query suggestion database may be determined and/or ranked according to one or more methods and/or apparatus described herein.

In some implementations, the search engine 125 and/or the computing device 105 may optionally provide a completed query to the query suggestion engine 120. A completed query is a query that the user has indicated is complete. The query suggestion engine 120 may then match the completed query to one or more query suggestions to determine one or more query suggestions for the user's completed query. For example, one or more query suggestions may be determined based on a query template as described herein. The query suggestion engine 120 then provides these query suggestions to the user. The query suggestions may, for example, be embedded within a search results web page to be displayed in an application, such as the web browser 110, as potential further search options.

In some implementations, the content database 130 may include an entity database that includes, inter alia, mappings of relations between entities. In some implementations, entities are topics of discourse. In some implementations, entities are persons, places, concepts, and/or things that can be referred to by a text fragment (e.g., a term or phrase) and are distinguishable from one another (e.g., based on context). For example, the text "bush" in a query or on a webpage may potentially refer to multiple entities such as President George Herbert Walker Bush, President George Walker Bush, a shrub, and the rock band Bush. In some implementations, an entity may be referenced by a unique entity identifier that may be used to identify the entity. The unique entity identifier may be associated with one or more properties associated with the entity and/or with other entities. For example, in some implementations one or more entity databases may include properties associated with unique identifiers of one or more entities. For example, for each of a plurality of entities, a mapping (e.g., data defining an association) between the entities and one or more properties and/or other entities related with the entity may be identified in the entity database. For example, a unique identifier for the entity associated with "LAX" may be associated with a name or alias property of "LAX," another alias property of "Los Angeles International Airport" (an alternative name by which LAX is often referenced), a phone number property, an address property, and/or an entity type property of "airport" in the entity properties database. Additional and/or alternative properties may be associated with an entity in one or more databases such as an entity database. For example, as discussed herein, an entity may be associated with one or more entity categories. For example, the entity associated with the city San Francisco in California may be associated with the entity categories "city", "large cities", "cities in California", and "cities with a bay".

In this specification, the term "database" will be used broadly to refer to any collection of data. The data of the database does not need to be structured in any particular way, or structured at all, and it can be stored on storage devices in one or more locations. Thus, for example, the database may include multiple collections of data, each of which may be organized and accessed differently.

In some implementations, the content database 130 may contain previously submitted search queries and/or references to the search results of previously submitted queries. For example, a user may submit the query "restaurants in San Francisco" by submitting the query directly to search engine 125 or by selecting a query suggestion that was provided to the user in response to a partial query that was submitted by the user. The submitted query "restaurants in San Francisco" may be stored in the content database 130.

In some implementations, the template generator 115 may determine a query template based on one or more queries, such as queries from the content database. In some implementations the query template may be determined based on determining multiple queries conform to the query template. In some implementations the query template may be determined from a single query. For example, the template generator may identify the query "bike shops in san diego". A query template may be determined based on the query including the terms "bike shops in" followed by the additional term "san diego" that is a member of the entity category [city]. In some implementations the template generator 115 may access a query to entity mapping, as described herein, to determine that the additional term "san diego" is associated with the entity associated with the city of San Diego in California. In some implementations the template generator 115 may further access an entity mapping to determine that the entity associated with the city of San Diego in California is a member of the entity category [city]. Accordingly, the query template "bike shops in [city]" may be determined. In some implementations, a query template may be constructed by a user and ranked according to one or more techniques described herein.

In some implementations, the template generator 115 may identify one or more queries from the content database 130 and determine if the queries conform to a query template. The determination of multiple queries that conform to the query template may be utilized to determine the query template and/or to rank a determined query template. In some implementations, the queries that are identified by the template generator 115 may be queries that were previously submitted by one or more users. Template generator 115 may determine multiple queries as conforming to a query template if they share one or more matching terms, in addition to one or more terms that are a member of an entity category. As discussed herein, matching of terms may include exact matching and/or soft matching of the terms. For example, the template generator 115 may identify the queries "bike shops in san diego", "bike shops in los angeles", and "bike shops in louisville" from the content database 130. The queries may be determined to conform to a query template based on all of the queries including the common terms "bike shops in" followed by one or more additional terms that are members of the entity category "city". Accordingly, the immediately preceding queries conform to the query template "bike shops in [city]".

In some implementations, the template generator 115 may ignore one or more terms, such as stop words (e.g. "a," "of," and "in"), in determining if one or more queries conform to a query template. For example, the template generator 115 may determine "bike shops los angeles," "bike shops in san diego," and "bike shops around louisville" conform to the query template "bike shops in [city]". In some implementations, the template generator 115 may ignore white space between terms and/or a lack of space between terms in previously submitted queries. For example, "bikeshop in losangeles" and "bike shop san diego" may be determined to conform to the query template "bike shops in [city]". In some implementations, the template generator 115 may determine that queries that include matching terms that are in a different position as queries that conform to a query template. For example, template generator 115 may determine that "bike shops los angeles" and "san diego bike shops" conform to the query template "bike shops [city]" and/or the query template "[city] bike shops". In some implementations, the template generator 115 may canonicalize one or more terms of a query into a standard tense and/or pluralization in determining whether the query conforms to a query template. For example, template generator 115 may determine "flows west mississippi river" and "flowing west ohio river" have the common terms "flow west" and/or "flowing west", and determine they conform to the query template "flow west [river]". Also, for example, the template generator 115 may determine "lakes near detroit" and "lake near chicago" have the common terms "lake near", and determine they conform to the query template "lake near [city]".

In some implementations, one or more terms that may otherwise be canonicalized and/or may be stop words may not be modified in determining conformity to a query template. Whether one or more terms are modified may be based on, for example, syntactical and/or semantical properties of the query and/or search result documents that are returned responsive to the query. For example, "rivers near ohio" and "river ohio" may not be recognized as conforming to a query template since the likely meaning of the queries is different, such as "rivers near ohio" as a query to return documents regarding rivers that are proximate to the state of Ohio and "river ohio" as a query to return documents regarding the Ohio River.

As discussed, template generator 115 may determine one or more terms in the identified queries are terms that are members of an entity category in determining whether the identified queries conform to a query template. For example, the template generator 115 may determine "los angeles" is a term that is an alias that is a member of the entity category "city". Also, for example, the template generator 115 may identify "san diego" as a term that is an alias that is a member of the entity category "city". In some implementations the template generator 115 may identify terms of a given query that are a member of a given entity category via a database such as content database 130. For example, in some implementations a database may include a query to entity mapping for a plurality of queries. The query to entity mapping may, for each query, map the query to one or more entities that are associated with the query and/or may map one or more terms of the query to one or more entities that are associated with such one or more terms. A mapping between a query and one or more entities may be based on, for example, a determination that search result documents responsive to the query include the one or more entities. For example, for the query "battleship movie" it may be determined that search result documents responsive to the query are heavily focused on the entity associated with the film "Battleship". A mapping between the query "battleship movie" and the entity associated with the film "Battleship" may be based on such a determination.

For example, the query "battleship gross sales" may be mapped to the entity associated with the film "Battleship". An entity database may be consulted to determine that the term "Battleship" is an alias of the entity associated with the film "Battleship" and to determine that the entity associated with the film "Battleship" is a member of the entity category [films]. Accordingly, it may be determined that the term "battleship" in the query "battleship gross sales" is a member of the entity category [films]. Based on such a determination, it may be determined that the query "battle ship gross sales" conforms to a query template of "[film] gross sales". Also, for example, the query "board game battleship" may be mapped to the entity associated with the board game "Battleship". An entity database may be consulted to determine that the term "Battleship" is an alias of the entity associated with the board game "Battleship" and to determine that the entity associated with the board game "Battleship" is a member of the entity category [board games]. Accordingly, it may be determined that the term "battleship" in the query "board game battleship" is a member of the entity category [board games]. Based on such a determination, it may be determined that the query "board game battleship" conforms to a query template of "board game [board game]". It is noted that in some implementations the term "battleship" in the query "board game battleship" will not be determined to be a member of the entity category [film], since the query "board game battleship" may not be mapped to the entity associated with the film "Battleship".

In some implementations, such as those that utilize a query to entity mapping in determining whether one or more terms in a query are terms that are members of an entity category, only one or more of the entities that are mapped to the query may be utilized. For example, in the preceding example the query "board game battleship" may be mapped to the entity associated with the film "Battleship", but the mapping to the entity associated with the film may be associated with a relatively weak ranking (e.g., reflecting the relatively low prominence of search results associated with the film in response to the query). In some implementation, only the entities mapped to the query and associated with at least a threshold ranking may be utilized. In some implementation, only the highest ranked entity mapped to the query may be utilized.

In some implementations, in determining whether one or more terms in the identified queries are terms that are members of an entity category, a listing of terms associated with the entity category may be directly consulted. For example, a database such as content database 130 may include multiple entity categories, and, for each entity category, a listing of terms that are members of the entity category. If a given query contains a term that is mapped to an entity category, the term may be determined to be a member of that entity category in determining whether the given query conforms to a query template. In some implementations, it must be determined that a term of a query is mapped to an entity category and that the query is mapped to an entity that is included in the entity category (e.g., via a query to entity mapping). In some implementations, the template generator 115 may determine terms that are members of an entity category by identifying aliases of entities that are mapped to the same property that is indicative of a given category. For example, the template generator 115 may determine "los angeles" and "san diego" belong to an entity category of [city] based on both being aliases of entities that are mapped to an entity property of "city." In some implementations, the template generator 115 may determine that an alias of an entity belongs to multiple entity categories. For example, "los angeles," "san diego," and "louisville" may be aliases of the entity category "city"; and "los angeles" and "san diego" may be aliases of the entity category "California cities"; and the alias of "louisville" may not be mapped to the entity associated "California cities".

In some implementations, the template generator 115 may determine a ranking of a determined query template. The ranking is indicative of the usefulness of the query template in forming query suggestions. In some implementations, the ranking of a query template may be utilized to determine if the template is a valid template. In some implementations, the ranking of a query template may additionally and/or alternatively be associated with the template and utilized in determining whether to utilize a query template in forming a query suggestion and/or for determining a ranking of a query suggestion formed based on the query template.

In some implementations the ranking of a query template may be based on cohesiveness of the entity category. The cohesiveness of the entity category may be indicative of similarity between entities of the entity category, with more similarity indicating greater cohesiveness. A high degree of similarity between entities of the entity category will influence the ranking in a more positive manner than would a low degree of similarity between the entities. For example, an entity category such as [movie subject] may include a number of entities that have little similarity between one another apart from being associated with the entity category [movie subject]. For example, [movie subject] may include a number of entities associated with divergent topics such as "aliens", "art", and "wars". Accordingly, in some implementations the entity category [movie subject] may be identified as having a low level of cohesiveness. On the other hand, an entity category [U.S. presidents] may include entities that have a high degree of similarity between one another. Ranking of a query template based on cohesiveness of the entity category may demote query templates that may produce non-useful and/or odd query suggestions. For example, ranking of a query template based on cohesiveness of the entity category may prevent query templates that include an entity category that fails to satisfy a threshold level of cohesiveness from being considered a valid query template.

In some implementations the ranking of a query template may be based on a number of identified previously submitted queries that conform to the query template. For example, in some implementations, the template generator 115 may determine the ranking is positively impacted when the number of identified previously submitted queries that conform to the query template satisfies a threshold. Also, for example, in some implementations, the template generator 115 may determine the ranking is positively impacted to a degree that is based on the number of identified previously submitted queries that conform to the template (e.g., the more that conform, the higher the ranking). In some implementations determining the number of identified previously submitted queries that conform to the query template may take into account the frequency of occurrence of one or more of the queries. For example, a given query that was submitted 10 times may be weighted more heavily (e.g., counted 10 times, or counted more than once) than another query that was submitted only once. In some implementations, determining the number of identified previously submitted queries that conform to the query template may ignore the frequency of occurrence of one or more of the queries (e.g., each query counted only once, regardless of frequency of occurrence).

In some implementations, the ranking of a query template may include determining whether a template is valid based on whether the number of identified previously submitted queries that conform to the template satisfies a threshold. For example, the template generator 115 may identify 1,000,000 previously identified queries and identify a first query template of "bike shop [city]" and a second query template of "independently owned bike shop [city]". A threshold may be determined based on the number of previously identified queries and/or otherwise determined (e.g., a default threshold). For example, the threshold may be 20. Template generator 115 may determine that 500 of the previously submitted queries conform to the first query template of "bike shop [city]" and determine the first query template is potentially valid. On the other hand, template generator 115 may determine that only 10 of the previously submitted queries conform to the second query template of "independently owned bike shop [city]" and determine the second query template is potentially not valid. In some implementations, the number of identified previously submitted queries that conform to the query template, and/or the threshold, may be based on a percentage.

In some implementations the ranking of a query template may be based on determining the number of entities that are members of the entity category of the query template and that are present in at least one previously identified query that conforms to the template. For example, the query template may be "restaurants in [city]" and the entity category [city] may be associated with 100,000 entities. The template generator 115 may determine that 10,000 entities that are associated with the entity category [city] are present in the previously identified queries that conform to the template "restaurants in [city]". Accordingly, 10% of the entities that are members of the entity category [city] are present in the previously identified queries that conform to the template "restaurants in [city]". The ranking may be positively influenced as the number of entities that are members of the entity category and that are present in at least one previously identified query increases. Accordingly, the ranking of the query template "restaurants in [city]" may be more positively influenced if 20,000 of the entities that are members of the entity category [city] are present in the previously identified queries that conform to the template "restaurants in [city]", than if only 10,000 of the entities were present.

In some implementations, determining a ranking may include determining whether a template is valid based on whether the number of entities that are members of the entity category of the query template and that are present in at least one previously identified query that conforms to the template satisfies a threshold. For example, the template generator 115 may identify a first query template of "bike shop [city]" and a second query template of "independently owned bike shop [city]". The template generator 115 may further determine that the entity category associated with [city] may be associated with 100,000 entities. A threshold may be determined based on the number of associated entities and/or otherwise determined (e.g., a default threshold). For example, the threshold may be 5% of the entities. Template generator 115 may determine that 7% of the entities that are members of the category [city] are present in the previously submitted queries conforming to the first query template of "bike shop [city]" and determine the first query template is potentially valid. On the other hand, template generator 115 may determine that only 1% of the entities that are members of the category [city] are present in the previously submitted queries conforming to the second query template of "independently owned bike shop [city]" and determine the second query template is potentially not valid.

In some implementations the ranking of a query template may be based on determining similarity between the frequency of occurrences of the members of the entity category in previously identified queries that conform to the templates and the frequency of occurrences of the same entities in an additional set of previously identified queries that include queries that do not conform to the template. The ranking is positively influenced as the similarity between the frequency of occurrences of the entities of the entity category in previously identified queries that conform to the templates and the frequency of occurrences of the same entities in an additional set of previously identified queries increases. For example, the query template may be "restaurants in [city]" and it may be determined that the entity associated with San Francisco occurs with a first frequency in the previously identified queries that conform to the query template and it may be determined that the entity associated with San Diego occurs with a second frequency in the previously identified queries that conform to the query template. For example, it may be determined that the entity associated with San Francisco occurs in 0.08% of the queries conforming to the query template and that the entity associated with San Diego occurs in 0.06% of the queries conforming to the query template. It may further be determined that the entity associated with San Francisco occurs with a third frequency in an additional set of previously identified queries that include queries that do not conform to the template (e.g., all identified queries, all identified queries that include an entity of the category [city]) and it may be determined that the entity associated with San Diego occurs with a fourth frequency in the additional set of queries. For example, it may be determined that the entity associated with San Francisco occurs in 0.08% of the queries in the additional set of queries and that the entity associated with San Diego occurs in 0.06% of the queries conforming to the additional set of queries. Accordingly, the distributions between the frequency of occurrences for San Francisco and San Diego are the same between the queries conforming to the template and the additional set of queries. Based on such distributional similarity, the ranking of the query template may be positively influenced. Comparing frequency of occurrences between only two entities is discussed in the preceding example for the sake of simplicity. As discussed herein, distributional similarity between more than two entities may be considered.

In some implementations, determining a ranking may include determining whether similarity between the frequency of occurrences of the members of the entity category in previously identified queries that conform to the templates and the frequency of occurrences of the same entities in an additional set of previously identified queries that include queries that do not conform to the template satisfies a threshold. For example, a similarity measure may be determined based on the similarity between the frequency of occurrences of the members of the entity category in previously identified queries that conform to the templates and the frequency of occurrences of the same entities in an additional set of previously identified queries that include queries that do not conform to the template. If the similarity measure satisfies a threshold, the query template may be considered potentially valid. If the similarity measure fails to satisfy the threshold, the query template may be considered potentially invalid.

Referring to FIGS. 6A-7B, further examples are provided of determining the ranking of a query template based on determining similarity between the frequency of occurrences of the members of the entity category in previously identified queries that conform to the templates and the frequency of occurrences of the same entities in an additional set of previously identified queries that include queries that do not conform to the template.

Figure 6A:
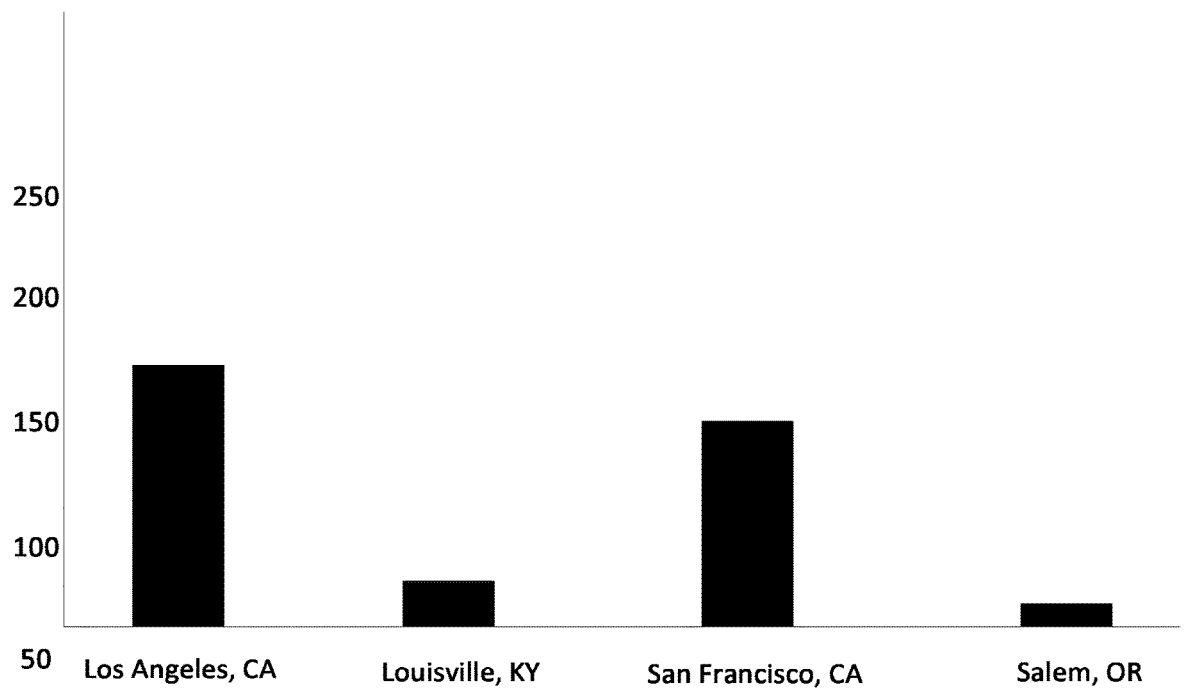
FIG. 6A illustrates an example histogram of the frequency of occurrences of members of an entity category in a group of queries that conform to a query template.
Figure 6B:
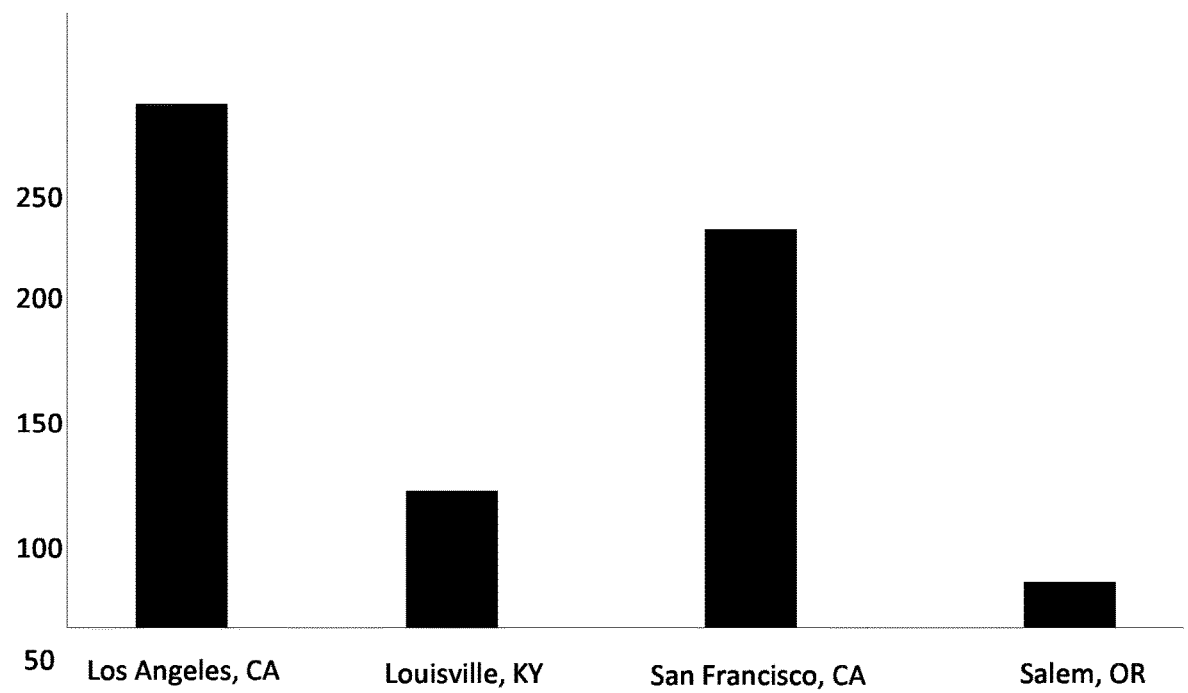
FIG. 6B illustrates an example histogram of the frequency of occurrences of the members of the category of FIG. 6A in a group of queries that includes queries that do not conform to the template.

In FIG. 6A an example histogram is illustrated of the frequency of occurrence of four entities of an entity category [city] in a set of queries that conform to the query template "restaurants in [city]". In FIG. 6B an example histogram is illustrated of the frequency of occurrence of the same four entities in an additional set of identified queries that include queries that do not conform to the query template. In some implementations the additional set of queries may include one or more of the queries that conform to the template "restaurants in [city]". In some implementations the additional set of queries may include all queries from a log of past queries. In some implementations the additional set of queries may include only queries that include entities of the entity category [city]. FIGS. 6A and 6B illustrate histograms of frequencies of occurrences that the template generator 115 may determine have a high degree of similarity between sets and that may positively influence the ranking of the query template.

Referring to FIG. 6A, the cities of "Los Angeles, Calif."; "Louisville, Ky."; "San Francisco, Calif."; and "Salem, Oreg." are illustrated. Although only four cities are illustrated, it is understood that similarity of frequency of occurrences may be determined utilizing additional cities. For example, in some implementations, all cities that are present in a set of queries that conform to the query template "restaurants in [city]" may be utilized. Also, for example, in some implementations a subset of cities (e.g., 200 randomly selected cities) that are present in a set of queries that conform to the query template "restaurants in [city]" may be utilized.

The template generator 115 may identify the frequency of occurrences of the four illustrated members of the entity category [city] in queries that conform to the template "restaurants in [city]". In the illustrated histogram, the frequency of occurrences of the cities in the queries are represented by the height of the bars. For example, the queries that conform to the template and include the entity associated with "los angeles" occur approximately 120 times. As discussed herein, in some implementations, the template generator 115 may include multiple aliases for an entity in determining frequency of occurrence. For example, the frequency of occurrence count for "los angeles" may include 70 occurrences of the query "restaurants in los angeles" and 50 occurrences of the query "restaurants in LA".

Referring to FIG. 6B, frequency of occurrences are illustrated for the same members of the category of [city] for a set of queries that includes queries that do not conform to the template "restaurants in [city]". In some implementations, the set of queries may include both queries that conform to the query template and non-conforming queries. For example, the set of queries may include both "restaurants in los angeles" and the query "basketball team los angeles." Also, for example, only queries that do not conform to the template may be utilized to determine the count. The frequency of occurrences of the cities in FIG. 6B are distributionally similar to the frequency of occurrences of the cities in FIG. 6A. Each of the cities in FIG. 6B has approximately twice the frequency of occurrence as illustrated in FIG. 6A, but represent similar distributions relative to one another. The larger frequency of occurrence of FIG. 6B may be due to, for example, a larger set of queries being considered.

Template generator 115 may determine the similarity between the frequency of occurrences of the members of the category in previously identified queries that conform to the templates and the frequency of occurrences of the same entities in an additional set of previously identified queries that include queries that do not conform to the template. For example, the template generator 115 may use one or more statistical methods, such as a goodness-of-fit test, a chi-squared analysis, and/or entropy-based methods to determine the similarity.

Figure 7A:
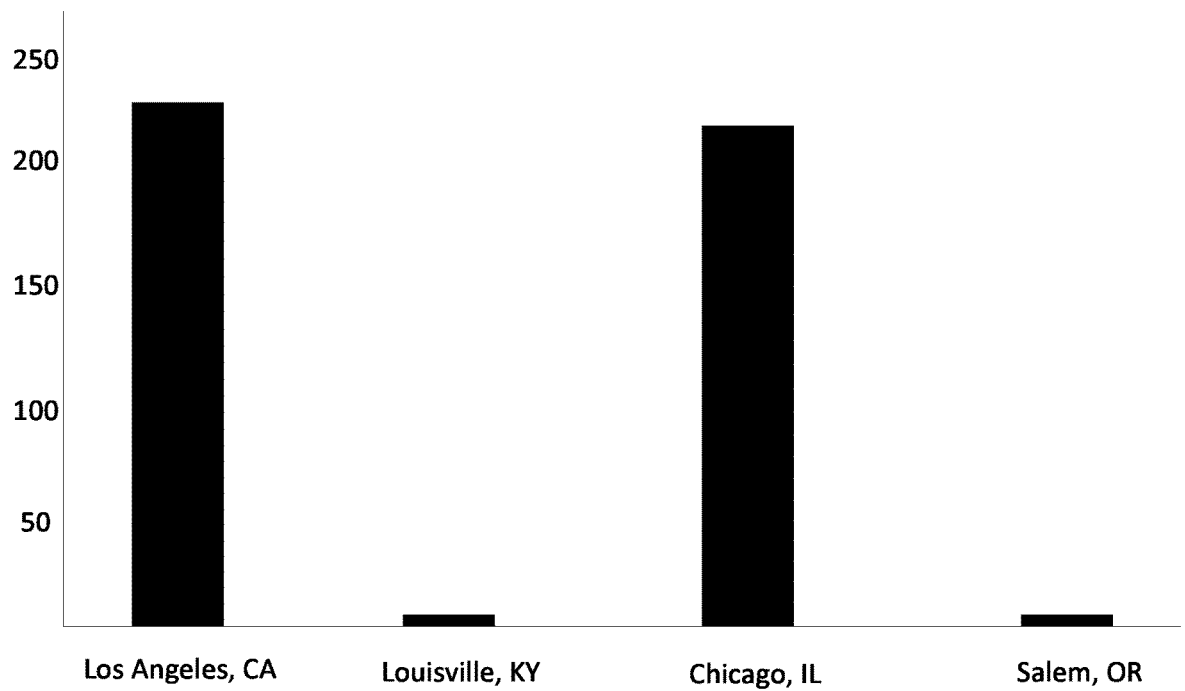
FIG. 7A illustrates another example histogram of the frequency of occurrences of members of an entity category in a group of queries that conform to a query template.
Figure 7B:
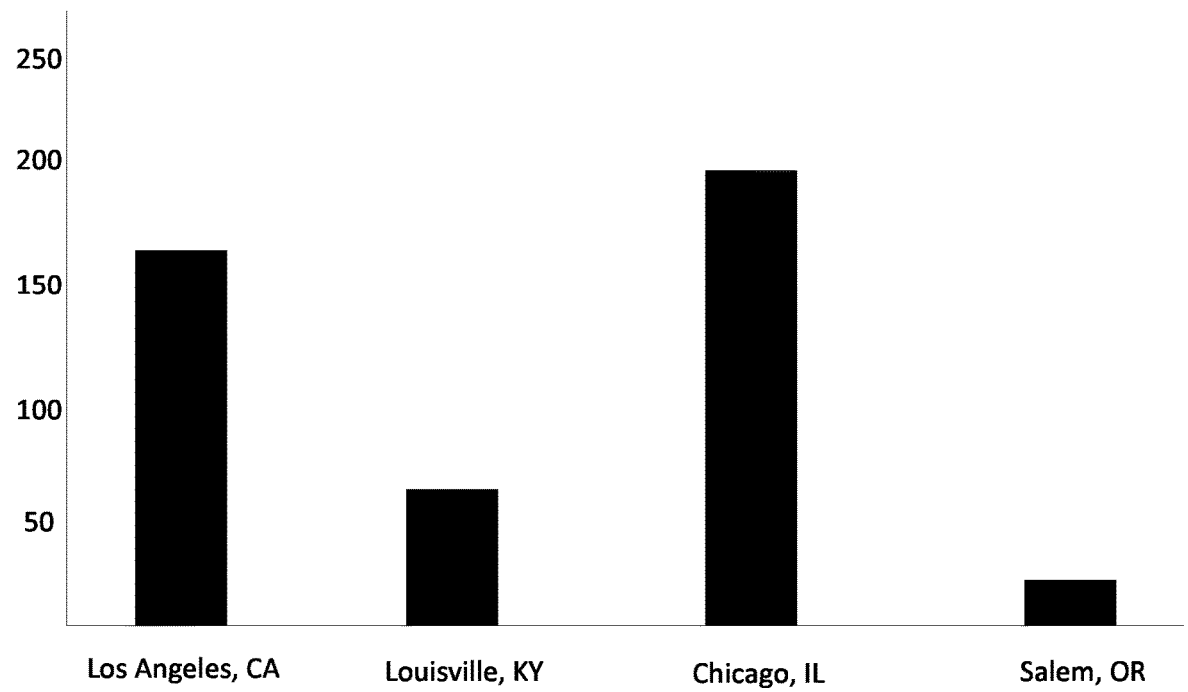
FIG. 7B illustrates another example histogram of the frequency of occurrences of the members of the category of FIG. 7A in a group of queries that includes queries that do not conform to the template.

In FIG. 7A an example histogram is illustrated of the frequency of occurrence of four entities of an entity category [city] in a set of queries that conform to the query template "NBA team in [city]". In FIG. 7B an example histogram is illustrated of the frequency of occurrence of the same four entities in a set of previously identified queries that include queries that do not conform to the query template. FIGS. 7A and 7B illustrate histograms of frequencies of occurrences that the template generator 115 may determine do not have a high degree of similarity between sets that may negatively influence the ranking of the query template and/or positively influence the ranking of the query template to only a limited degree.

Referring to FIG. 7A, the cities of "Los Angeles, Calif."; "Louisville, Ky."; "Chicago, Ill." and "Salem, Oreg." are illustrated. Although only four cities are illustrated, it is understood that similarity of frequency of occurrences may be determined utilizing additional cities. The template generator 115 may identify the frequency of occurrences of the four illustrated members of the entity category [city] in queries that conform to the template "NBA teams in [city]". As illustrated, the entities associated with "Los Angeles, Calif." and "Chicago, Ill." have frequencies of occurrence of approximately 225 in FIG. 7A, wherein the entities associated with "Louisville, Ky." and "Salem, Oreg." have minimal frequencies of occurrence (due to, for example, limited query submissions conforming to the query template for those entities since NBA teams are not present in those cities).

Referring to FIG. 7B, frequency of occurrences are illustrated for the same members of the category of [city] for an additional set of queries that includes queries that do not conform to the template "NBA team in [city]". In some implementations, the additional set of queries may include both queries that conform to the query template and non-conforming queries. Also, for example, only queries that do not conform to the template may be utilized to determine the frequency of occurences. The frequency of occurrences of the cities in FIG. 7B are distributionally dissimilar to the frequency of occurrences of the cities in FIG. 7A. For example, entities associated with "Louisville, Ky." and "Salem, Oreg." represent a much larger frequency of occurrence in FIG. 7B than in FIG. 7A.

Template generator 115 may determine the similarity between the frequency of occurrences of the members of the category in previously identified queries that conform to the templates and the frequency of occurrences of the same entities in an additional set of previously identified queries that include queries that do not conform to the template. For example, the template generator 115 may use one or more statistical methods, such as a goodness-of-fit test, a chi-squared analysis, and/or entropy-based methods to determine the similarity.

Various techniques of determining the ranking of a query template are described herein. The ranking of a query template may be based on one or more such techniques and/or additional techniques. For example, whether a query template is a valid query template may be based on: cohesiveness of the entity category of the query template; the number of entities that are members of the entity category and that are present in at least one previously identified query that conforms to the query template; a number of identified previously submitted queries that conform to the query template; and a similarity between the frequency of occurrences of the members of the entity category in previously identified queries that conform to the templates and the frequency of occurrences of the same entities in an additional set of previously identified queries that include queries that do not conform to the template. For example, a cumulative ranking may be determined based on all of the preceding factors and the query template may be considered valid if the cumulative ranking satisfies a threshold. Also, for example, individual rankings may be determined for each of the preceding factors and the query template may be considered valid if the individual rankings each satisfy a threshold. Additional and/or alternative combinations of one or more of the techniques described herein may be utilized to determine a ranking for a query template.

In some implementations, the template generator 115 may store determined query templates in the content database 130. In some implementations the query templates may only be stored as valid query templates when the templates are determined to be valid by the template generator 115. In some implementations any determined ranking associated with the query templates may optionally be associated with the query templates in the content database 130.

The query suggestion engine 120 may identify one or more query templates that were formulated by the template generator 115 and utilize the query template in formulating query suggestions for partial queries. In some implementation the query templates may be utilized to formulate query suggestions to expand a database of existing query suggestions. In some implementations the query templates may be utilized to formulate query suggestions in real time.

As an example of formulating a query suggestion based on a query template, the query suggestion engine 120 may identify a partial query and determine a query template that includes one or more terms from the partial query. For example, for the partial query "restuarants i", the query template "restaurants in [city]" may be identified. One or more query suggestions may then be determined based on the identified query template. For example, a query suggestion may be determined by inserting an alias for an entity from the entity category [city] into the query template. In some implementations which alias of an entity is inserted into the query template may be based on the popularity of the entity and/or the popularity of the alias. Popularity may be based on one or more factors such as, for example, popularity in past queries. For example, the entity associated with the city of San Francisco, Calif. may be more popular than the entity associated with Anchorage, Ak. Likewise, an alias of "San Francisco" associated with the entity associated with the city of San Francisco may be more popular than an alias of SF associated with the entity associated with the city of San Francisco.

In some implementations the alias of an entity inserted into the query template may be based on additional and/or alternative factors. For example, when the query suggestion is being formulated responsive to a partial query from a particular user, the alias of an entity inserted into the query template may be based on the relationship between the user and the entity and/or the user and the alias. For example, a user may be located in Anchorage, Ak. and the entity associated with the city of Anchorage, Ak. may be more likely to be chosen based on the user's location. Also, for example, when the query suggestion is being formulated responsive to a partial query from a particular user, the alias of an entity inserted into the query template may be based on entities associated with previous search requests of the user. For example, a user may frequently issue search queries associated with the entity of Anchorage, Ak. and the entity associated with the city of Anchorage, Ak. may be more likely to be chosen based on the user's past search queries.

In some implementations, when a partial query includes one or more characters of the entity category of the query template, the query suggestion engine 120 may access an entity database to identify one or more potential aliases based on the one or more characters. For example, for the partial query "restaurants in s", the query template "restaurants in [city]" may be identified. One or more query suggestions may then be determined based on the identified query template by inserting an alias that starts with "s" for an entity from the entity category [city] into the query template. For example, aliases of cities may be identified such as "San Francisco", "Santa Monica", and "Santa Fe". Also, for example, the user may enter the partial query "bike shops s" as a partial query. Query suggestion engine 120 may identify the template "bike shops [city]" as a potential template based on both the partial query and the template including the terms "bike shops." The query suggestion engine 120 may access an entity database and identify an entity for the entity category [city], and may further identify one or more aliases of entities that are mapped to the entity category [city], such as "San Diego" and "San Francisco." The query suggestion engine may identify similarity between the term "s" in the partial query and one or more of the aliases in the entity database (e.g., "San Diego" and "San Francisco"); and the query suggestion engine 120 may provide the user with one or more query suggestions that conform to the template and include an alias that begin with "s". For example, the query suggestion engine 120 may provide the user with the query suggestions "bike shops in San Diego" and "bike shops in San Francisco" as potential completion queries for the partial query of the user. The user may select one of the query suggestions and submit the selected query suggestion to the search engine 125, and/or the user may enter additional characters to generate a new partial query (e.g., enter "bike shops in sa").

As another example of formulating a query suggestion based on a query template, the query suggestion engine 120 may identify a partial query and determine an entity category that is mapped to one or more terms from the partial query. For example, for the partial query "snow white and the huntsman", the terms "snow white and the huntsman" can be identified as being mapped to the entity category of [films]. In some implementations the entity category for one or more terms of a query may be identified utilizing an entity database as described herein. Based on the entity category of [films], one or more query templates including the entity category [films] may be identified such as, for example the query template "[film] actors". The identified query template may then be utilized to determine a query suggestion of "snow white and the huntsman actors". Also, for example, for the partial query "snow white and the huntsman gr", the terms "snow white and the huntsman" can be identified as being mapped to the entity category of [films]. Based on the entity category of [films], and the additional characters "gr" following the entity category of [films], one or more query templates including the entity category films and the characters "gr" may be identified such as, for example the query template "[film] gross sales". The identified query template may then be utilized to determine a query suggestion of "snow white and the huntsman gross sales". Also, for example, for the partial query "snow white and the hu", the terms "snow white and the huntsman" can be identified based on an existing query suggestion for "snow white and the hu". The terms "snow white and the huntsman" may be mapped to the entity category of [films]. Based on the entity category of [films], one or more query templates including the entity category [films] may be identified such as, for example the query template "[film] actors". The identified query template may then be utilized to determine a query suggestion of "snow white and the huntsman actors".

In some implementations, the query suggestion engine 120 may rank one or more query suggestions determined based on a query template. In some implementations, the ranking of a query suggestion may be based on the ranking of the query suggestion template that was utilized to formulate the queries suggestions. For example, template generator 115 may determine that the query template "rivers in [state]" is a higher ranked query template for query suggestions than "rivers in [city]" based on one or more of the criteria described herein and determine rankings of query suggestion based on the query templates based on such rankings. In some implementations the ranking of a query suggestion determined based on a query template may additionally and/or alternatively be based on a popularity of the alias and/or entity associated with the alias that is inserted into the query suggestion. For example, the popularity of the query suggestion may be based on the popularity of the alias that is inserted into the query template to form the query suggestion and based on the popularity of the entity associated with the alias that is inserted into the query suggestion. As discussed herein, one or more databases may store information about the popularity of an entity and/or an alias of an entity. For example, the query suggestion engine 120 may identify that the entity associated with "San Antonio" is more popular than the entity associated with "Saskatoon" and determine a ranking of a query suggestion including "San Antonio" and/or "Saskatoon" based on such popularity. Also, for example, the query suggestion engine 120 may identify that the alias "San Antonio" associated with the entity "San Antonio" is more popular than the alias "SAT" associated with the entity "San Antonio" and determine a ranking of a query suggestion including "San Antonio" and/or "SAT" based on such popularity.

In some implementations, the query suggestion engine 120 may rank one or more entities and/or aliases utilized to form query suggestions based on information that is specific to the user. The query suggestion engine 120 may use documents of the user, such as emails, navigation history, information from one or more applications of the user, and/or associated information regarding characteristics of the user (e.g., location of the user, age group of the user, interests of the user) that have been identified. For example, the query suggestion engine 120 may identify a webpage that the user has previously navigated about the entity associated with the city of San Diego, and the query suggestion engine 120 may rank a query suggestion "restaurants in san diego" (determined based on a query template) based on the likelihood that the user has more interest in identifying one or more additional documents about San Diego than another city that may otherwise be selected. In some implementations, the query suggestion engine 120 may identify the current location of the user and utilize the location to rank an entity and/or alias utilized in forming a query suggestion for the user based on a query template. For example, the query suggestion engine 120 may boost a query suggestion that includes "san diego" over a query suggestion that includes "san antonio" based on information that the user is in San Diego, such as information from a GPS and/or IP address from computing device 105.

Many other configurations are possible having more or less components than the environment shown in FIG. 1. For example, although the query suggestion engine 120 and the template generator 115 are each illustrated alone in FIG. 1, it is understood that the query suggestion engine 120 and/or the template generator 115 may optionally be combined with one another and/or with one or more of the search engine 125 and/or the computing device 105 in some implementations.

Figure 2:
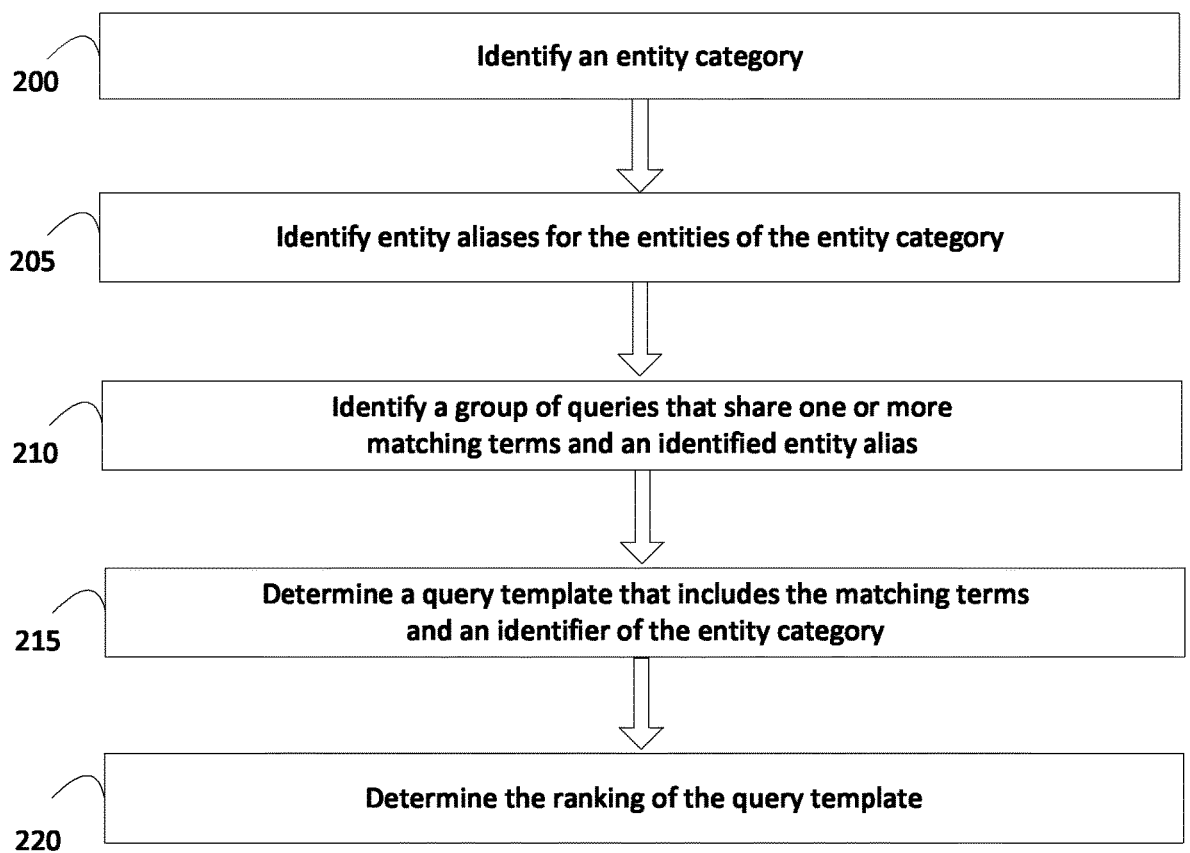
FIG. 2 is a flow chart illustrating an example method of determining a query template and ranking the query template.

Referring to FIG. 2, a flow chart illustrating an example method of determining a query template and ranking the query template is provided. Other implementations may perform the steps in a different order, omit certain steps, and/or perform different and/or additional steps than those illustrated in FIG. 2. The steps of the method illustrated in FIG. 2 may be performed by one or more components illustrated in FIG. 1 such as template generator 115.

At step 200, an entity category is identified. For example, the template generator 115 may identify the entity category by accessing a database that shares one or more characteristics with the content database 130. For example, the template generator 115 may identify an entity category [city], where multiple entities associated with cities may be members of the entity category. Also, for example, the template generator 115 may identify an entity category [animal], where multiple entities associated with animals may be members of the entity category.

At step 205, aliases are identified for entities that are associated with the entity category that was identified in step 200. The aliases of the associated entities may be an associated text representation of the entity, such as the name "Los Angeles" for the city of Los Angeles in California. In some implementations, an entity may be associated with multiple aliases. For example, the entity with the alias of "los angeles" may additionally be associated with the alias "LA" and "City of Angels," additional aliases of the entity of the city of Los Angeles.

At step 210, a group of queries is identified that share one or more matching terms and one or more of the aliases that were identified in step 205. The matching terms may be determined based on, for example, word matching, prefix based matching, edit distance, and/or a strict identity of the terms. For example, the queries "cities in New York" and "cities in California" may be identified as including the matching terms "cities in" and an alias of an entity that is mapped to the entity category [state]. In some implementations, terms may be determined as matching via one or more soft matching techniques such as ignoring optional stop terms, canonicalizing one or more terms, softening term position requirements, etc.

In some implementations, step 210 may optionally be performed before steps 200 and 205. For example, the template generator 115 may first identify queries that include matching terms and then identify one or more terms from the same queries that are non-matching between the queries and that may be members of the same category. Template generator 115 may access an entity database and determine whether the non-matching terms from multiple queries are aliases of entities that are associated with one entity category, and if so, identify the entity category. For example the template generator 115 may identify the queries "Oscar winner 1939" and "Oscar winner 2002" as including the common terms "Oscar winner" and the non-matching terms "1939" and "2002." Template generator 115 may identify entities in an entity database with aliases of "1939" and "2002," and identify that both entities are associated with the entity category of [years].

At step 215, a query template is determined. In some implementations the query template may be determined based on one or more queries that were identified at step 210. In some implementations the template may be determined prior to performing one or more of steps 200, 205, and 210. For example, a query template may be determined based on a single query by determining an entity category associated with a term of the single query and identifying additional terms of the single query. The entity category of the determined query template may be utilized to identify the entity category at step 200, and steps 205 and 210 may be utilized to identify a group of queries that conform to the query template. The template may include one or more common words from queries that were identified, and an entity category. For example, the template generator 115 may identify the query "best picture winner gone with the wind" as including the sequence of terms "best picture winner" and a term that is an alias for an entity that is associated with an entity category [movie].

At step 220, a ranking is determined for the query template that was determined at step 215. In some implementations, the ranking may be utilized to determine whether the template is a valid query template. In some implementations, the ranking may be utilized by the query suggestion engine 120 to determine the ranking of one or more query suggestions determined based on the query template. For example, a template may be determined to have a ranking that makes it unlikely that the template will be useful for providing query suggestions for a large number of partial queries. Also, for example, the template generator 115 may determine a query template as valid or not valid based on the ranking of the query template.

The ranking of the template may be determined utilizing one or more techniques described herein. For example, a ranking for a valid query template may be based on: cohesiveness of the entity category of the query template; the number of entities that are members of the entity category and that are present in at least one previously identified query that conforms to the query template; a number of identified previously submitted queries that conform to the query template; and a similarity between the frequency of occurrences of the members of the entity category in previously identified queries that conform to the templates and the frequency of occurrences of the same entities in an additional set of previously identified queries that include queries that do not conform to the template.

Figure 3:
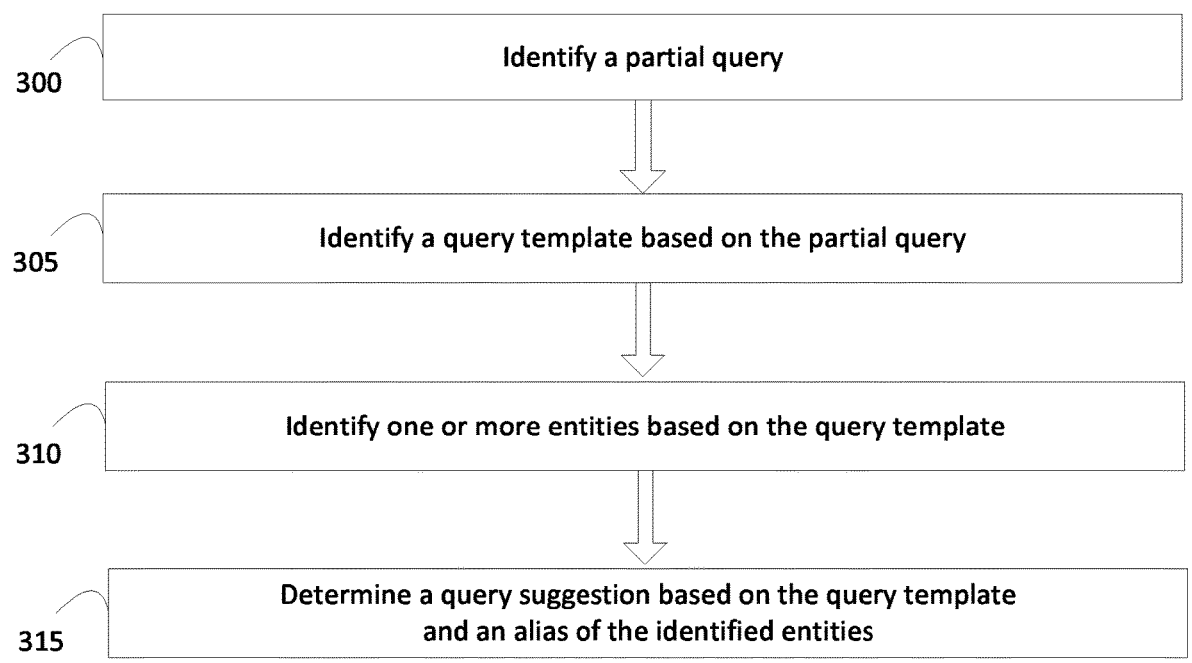
FIG. 3 is a flow chart illustrating an example method of providing one or more query suggestions to a user based on an identified query template.

Referring to FIG. 3, a flow chart illustrating an example method of providing one or more query suggestions to a user based on a query template is provided. Other implementations may perform the steps in a different order, omit certain steps, and/or perform different and/or additional steps than those illustrated in FIG. 3. The steps of the method illustrated in FIG. 3 may be performed by one or more components illustrated in FIG. 1. For example, the steps of the method of FIG. 3 may be performed by the query suggestion engine 120.

At step 300, a partial query of a user is identified. For example, the partial query may be provided to the query suggestion engine 120 by the user via an application executing on a computing device 105, such as browser 110. In some implementations, the user may enter the partial query to an interface that shares one or more characteristics with the graphical user interface in FIG. 5 and described herein.

At step 305, a query template is identified based on the partial query that was identified at step 300. For example, the query suggestion engine 120 may identify a query template from one or more query templates previously determined by the template recognition engine 115 and stored in content database 130. In some implementations, a query template may additionally include an associated ranking. In some implementations, the query suggestion engine 120 may identify a template based on similarity between one or more templates and the partial query that was entered by a user. For example, the query suggestion engine 120 may use prefix based matching, edit distance, and/or exact term matching to identify similarity between a partial query and a template. In some implementations, the query suggestion engine 120 may initially identify more than one potential template and determine the template to utilize for formulating query suggestions based on further refinement of the partial query by the user. For example, the query suggestion engine 120 may initially identify the query templates "baseball teams in [state]" and "basketball teams in [city]" based on the identified partial query "bas"; and the query suggestion engine 120 may identify only "baseball teams in [state]" if the user further provides an "e" to the query, making the partial query "base".

At step 310, one or more entities for the category that are included in the template that was identified at step 305 are identified. For example, the entities may be identified by the query suggestion engine 120 from an entity database. The query suggestion engine 120 may identify the entity category that is included with the template, and identify one or more entities that are associated with the entity category. For example, the query suggestion engine 120 may identify the template "baseball teams in [state]" from the partial query "baseball teams in t" and the query suggestion engine 120 may identify one or more entities that are associated with the entity for the category [state], such as the entities associated with the states of "texas" and "tennessee".

At step 315, at least one query suggestion is selected to provide to the user based on the query template and one or more of the aliases of the entities that were identified at step 310. In some implementations, the query suggestions may be selected based on one or more rankings associated with the query template, the alias inserted in the query suggestion, and/or the entity associated with the alias inserted in the query suggestion. For example, the query suggestion engine 120 may identify the entities associated with the cities of San Francisco, Calif. and Salem, Oreg. and determine that San Francisco is more likely to be the member of the category that is of interest to the user based on, for example, previous queries that have been submitted by users. The popularity of entities may be determined by the template generator 115 when the template is initially determined and/or based on additional information that is identified by the query suggestion engine 120 from one or more databases.

Figure 4:
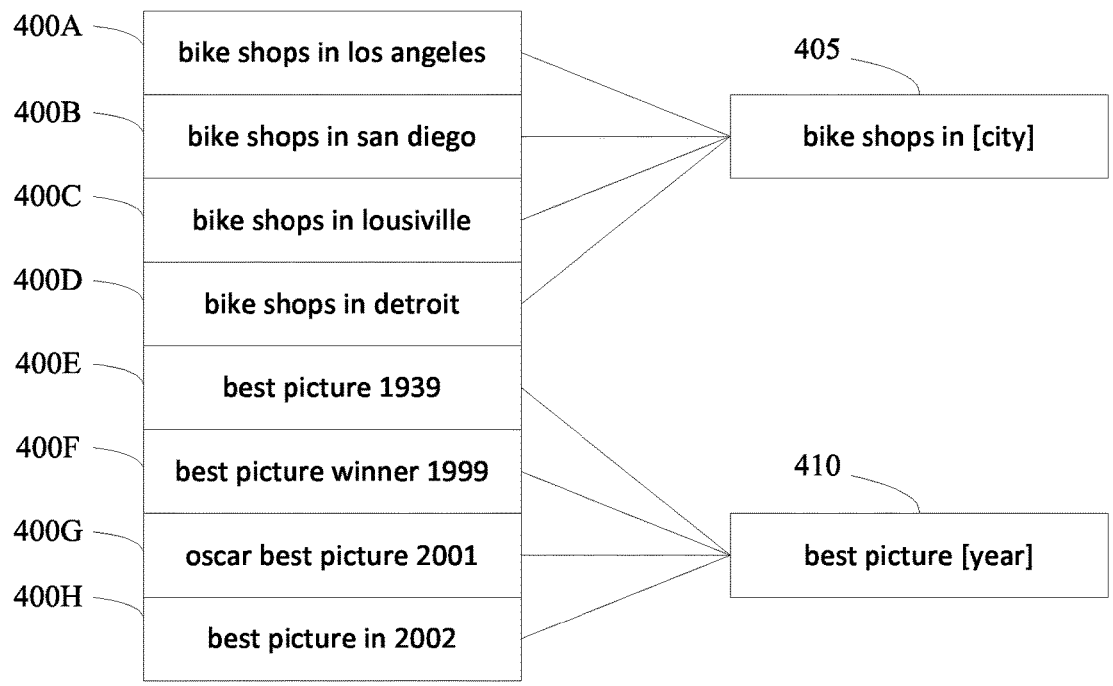
FIG. 4 illustrates a listing of queries and query templates that may conform to the queries.

Referring to FIG. 4, a listing of queries 400A-D that conform to a query template 405 and a listing of queries 400E-H that conform to a query template 410 are illustrated. In some implementations one or more of the queries 400A-H may be utilized to determine the respective query template 405 or 410. The queries 400A-H may be identified by template generator 115 utilizing a method that may include one or more steps of the method that is provided in FIG. 2. For example, the queries 400A-H of FIG. 4 may be the queries that are identified by the template generator 115 in step 210. Queries 400A-H are queries that may be identified from one or more sources. For example, the queries 400A-H may be identified from a database that shares one or more aspects with content database 130.

In some implementations the query template 405 may be determined based on one or more of the queries 400A-D. Likewise, in some implementation the query template 410 may be determined based on one or more of the queries 400E-H. For example, in the illustrated list of queries, all of queries 400A-D include the terms "bike shops in". Template generator 115 may identify one or more of the queries and determine that the terms "bike shops in" followed by one or more terms may be a valid template to utilize in future query suggestions. The template generator 115 may access an entity database and identify entities that are associated with aliases that match one or more additional terms in the queries 400 A-D (i.e., "los angeles," "san diego," "louisville," and "detroit"). Template generator 115 may identify that entities associated with the aliases are mapped to an entity category of [city], and determine the template "bike shops in [city]" 405.

Also, for example, the template generator 115 may identify queries 400E though 400H in a list of previously submitted queries and determine that one or more terms of the queries may be utilized in a template. In the queries 400E-H, the queries include one or more terms that are not common between the queries and that are not part of an entity category, such as "oscar" (400G) and "in" (400H). Template generator 115 may determine that query template 410 may exclude the non-matching words. Also, for example, the template generator 115 may determine the non-matching words are optional in the query template. In some implementations, the template generator 115 may identify only the queries that include common terms and a category member. As discussed herein, in some implementations, the template generator 115 may rank the determined templates 410 based on one or more criteria.

Figure 5:
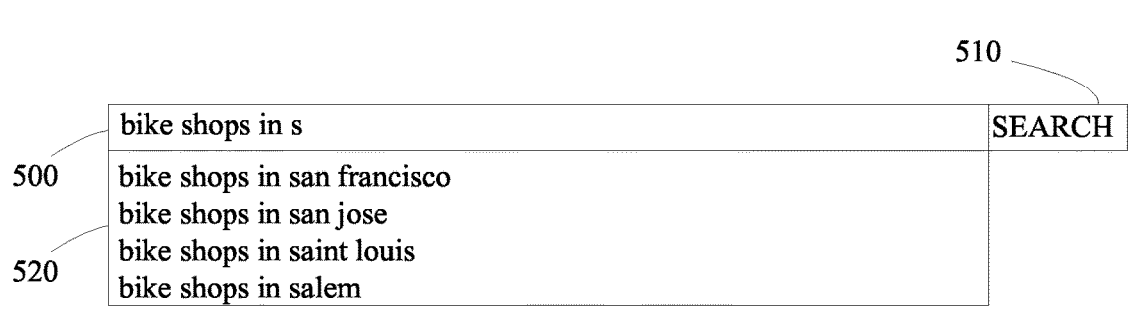
FIG. 5 illustrates an example graphical user interface of query completion suggestions that may be provided to the user based on a constructed query template.

Referring to FIG. 5, an example graphical user interface of query completion suggestions that are provided to the user based on a query template is illustrated. The interface may be provided to the user by one or more applications that are executing on computing device 105, such as browser 110. The suggestions may be provided to the one or more applications by a component that shares one or more characteristics with query suggestion engine 120.

In the illustrated interface, the user has entered a partial query of "bike shops in s" into the query input 500. The partial query may be submitted to the query suggestion engine 120 as described herein. Additionally or alternatively, the user may affirmatively select the search button 510 to submit the query to the search engine 125. Search engine 125 may provide one or more search results to the user in response to the query in query input 500 and may optionally provide one or more query suggestions for the query along with the search results. Query suggestion list 520 may include one or more suggestions for queries based on the partial query in query input 500. The user may click or otherwise select a query suggestion from the query suggestion list 520, and/or the user may continue to edit the query in query input 500. The query suggestions in query list 520 may be provided to the user by query suggestion engine 120. In some implementations, the partial query in query input 500 may be provided to the query suggestion engine 120 as the partial query is edited and/or when the user pauses for a predetermined amount of time.

The partial query "bike shops in s" may be provided to the query suggestion engine 120 and the query suggestion engine 120 may access a content database such as content database 130 to identify one or more query templates that may be utilized to identify query suggestions. The query templates may be determined by the template generator 115 and stored in the content database 130. In some implementations, the query suggestion engine 120 may identify one or more terms from the partial query that match one or more terms of a query template. For example, the query suggestion engine 120 may identify the template "bike shops in [city]" based on the partial query "bike shops in s."

The query suggestion engine 120 may identify one or more entities of the [city] category based on the presence of the category in the selected template. In some implementations, the query suggestion engine 120 may access an entity database that shares one or more characteristics with content database 130 to identify the one or more entities. The query suggestion engine 120 may identify one or more aliases of entities that are associated with such identified entities. For example, the query suggestion engine 120 may identify "New York," "San Francisco," and "Detroit" as aliases of entities that are members of the category [city].

In some implementations, the query suggestion engine 120 may determine one or more aliases of entities of the category as potential completions to one or more of the terms of the partial query. For example, the query suggestion engine 120 has provided a list of potential query completions in query suggestion list 520, and each query suggestion includes the terms of the template, "bike shops in", and a member of the entity category [city] that is a potential match to the terms of the partial query. The query suggestion engine 120 has provided a list of cities that begin with the character "s" including "san Francisco," "san jose", "saint louis", and "salem" appended to the terms "bike shops in". In some implementations, the query suggestion engine 120 may utilize one or more methods to determine potential matches between terms of the partial query and aliases of members of the category, such as prefix based matching and/or edit distance. In some implementations, query suggestion engine 120 may ignore stop words and/or canonicalize one or more terms in the partial query and/or aliases of entities of the category.

As another example of formulating a query suggestion based on a query template, the query suggestion engine 120 may identify a partial query and determine an entity category that is mapped to one or more terms from the partial query. For example, for the partial query "snow white and the huntsman", the terms "snow white and the huntsman" can be identified as being mapped to the entity category of [films]. Based on the entity category of [films], one or more query templates including the entity category [films] may be identified such as, for example the query template "[film] actors". The identified query template may then be utilized to determine a query suggestion of "snow white and the huntsman actors".

Figure 8:
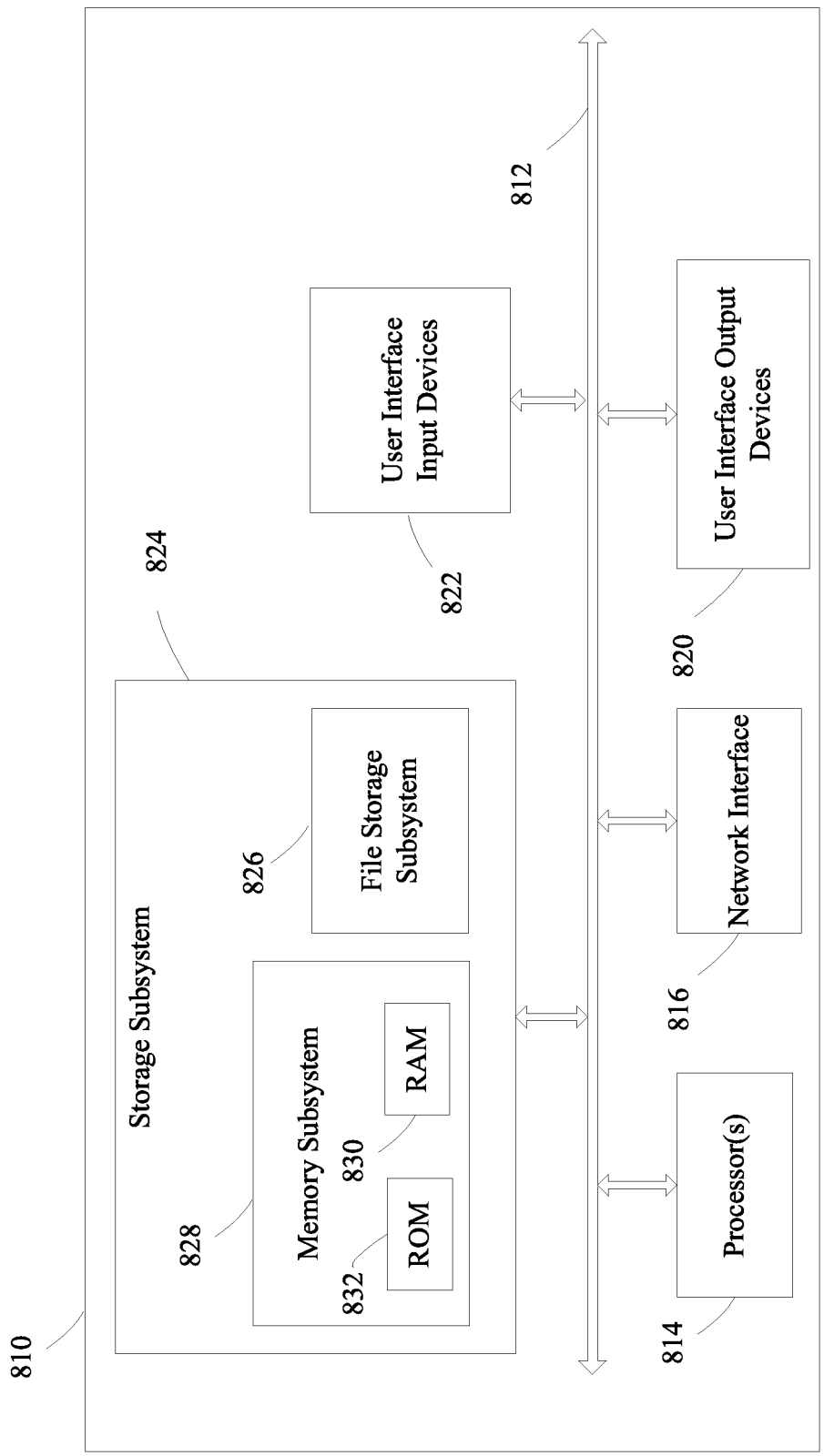
FIG. 8 illustrates a block diagram of an example computer system.

FIG. 8 is a block diagram of an example computer system 810. Computer system 810 typically includes at least one processor 814 which communicates with a number of peripheral devices via bus subsystem 812. These peripheral devices may include a storage subsystem 824, including, for example, a memory subsystem 826 and a file storage subsystem 828, user interface input devices 822, user interface output devices 820, and a network interface subsystem 816. The input and output devices allow user interaction with computer system 810. Network interface subsystem 816 provides an interface to outside networks and is coupled to corresponding interface devices in other computer systems.

User interface input devices 822 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 810 or onto a communication network.

User interface output devices 820 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 810 to the user or to another machine or computer system.

Storage subsystem 824 stores programming and data constructs that provide the functionality of some or all of the modules described herein. For example, the storage subsystem 824 may include the logic to determine and/or rank query templates based on one or more queries and entities according to one or more processes described herein.

These software modules are generally executed by processor 814 alone or in combination with other processors. Memory 826 used in the storage subsystem can include a number of memories including a main random access memory (RAM) 830 for storage of instructions and data during program execution and a read only memory (ROM) 832 in which fixed instructions are stored. A file storage subsystem 828 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem

828 in the storage subsystem 824, or in other machines accessible by the processor(s) 814.

Bus subsystem 812 provides a mechanism for letting the various components and subsystems of computer system 810 communicate with each other as intended. Although bus subsystem 812 is shown schematically as a single bus, alternative implementations of the bus subsystem may use multiple busses.

Computer system 810 can be of varying types including a workstation, server, computing cluster, blade server, server farm, or any other data processing system or computing device. Due to the ever-changing nature of computers and networks, the description of computer system 810 depicted in FIG. 8 is intended only as a specific example for purposes of illustrating some implementations. Many other configurations of computer system 810 are possible having more or fewer components than the computer system depicted in FIG. 8.

While several inventive implementations have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive implementations described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive implementations described herein. It is, therefore, to be understood that the foregoing implementations are presented by way of example only and that, within the scope of the appended claims and equivalents thereto, inventive implementations may be practiced otherwise than as specifically described and claimed. Inventive implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over vocabulary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one implementation, to A only (optionally including elements other than B); in another implementation, to B only (optionally including elements other than A); in yet another implementation, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one implementation, to at least one, optionally including more than one, A, with no B present (and optionally including elements other than B); in another implementation, to at least one, optionally including more than one, B, with no A present (and optionally including elements other than A); in yet another implementation, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

What is claimed is:

1. A method implemented by one or more processors, the method comprising:
    identifying a partial query entered by a user via a computing device of the user;
    identifying a current location of the user that entered the partial query, wherein the current location of the user corresponds to a location of the user when the user provided the partial query via the computing device;
    identifying a query template based on the partial query, wherein the query template includes one or more template terms and an identifier of an entity category, and wherein the entity category corresponds to a group of entities that share one or more aspects in common;
    generating a query suggestion based on the query template, wherein generating the query suggestion comprises:

identifying multiple different entity aliases based on the entity category that corresponds to the group of entities, selecting, from the multiple different entity aliases, an entity alias for an entity of the group of entities based on the current location of the user when the user entered the partial query, and including the one or more template terms and the entity alias in the query suggestion; and providing the query suggestion for presentation in response to the partial query.

2. The method of claim 1, wherein selecting the entity alias is further based on one or more characters of the partial query.

3. The method of claim 1, wherein selecting the entity alias is further based on a frequency of occurrence count of the entity alias in previously identified queries.

4. The method of claim 1, wherein identifying the query template based on the partial query comprises:

determining that one or more terms in the partial query match the one or more template terms of the query template.

5. The method of claim 1, wherein identifying the query template is further based on a ranking of the query template relative to other query templates.

6. A method implemented by one or more processors, the method comprising:

identifying a partial query entered by a user via a computing device of the user;

identifying a query template based on the partial query, wherein the query template includes one or more template terms and an identifier of an entity category, wherein the entity category is a group of entities that share one or more aspects in common, and wherein identifying the query template based on the partial query is based on partial query including at least one of the one or more template terms of the query template;

generating a query suggestion based on the query template, wherein generating the query suggestion comprises:

identifying multiple different entity aliases based on the entity category that corresponds to the group of entities, selecting, from the multiple different entity aliases, an entity alias for an entity of the group of entities based on information in one or more user documents associated with the user and accessible by the computing device via a network connection, wherein the information is different than the at least one or more template terms, and including the one or more template terms and the entity alias in the query suggestion; and providing the query suggestion for presentation in response to the partial query.

7. The method of claim 6, wherein the one or more user documents include one or more emails of the user.

8. The method of claim 6, wherein the one or more user documents include web pages identified by Internet navigation history.

9. The method of claim 7, wherein selecting the entity alias is further based on one or more characters of the partial query.

10. The method of claim 7, wherein selecting the entity alias is further based on a frequency of occurrence count of the entity alias, in the information in the one or more user documents associated with the user, relative to other frequency of occurrence counts corresponding to occurrences of multiple other aliases in the information.

11. The method of claim 7, wherein identifying the query template is further based on a ranking of the query template relative to other query templates.

12. The method of claim 6, wherein identifying the query template based on the partial query comprises:

determining an entity category based on the partial query; and determining the query template based on the determined entity category.

13. A system, comprising:

memory storing instructions; and one or more processors operable to execute the instructions stored in the memory to:

identify a partial query entered by a user;

identify a current location of the user that entered the partial query, wherein the current location corresponds to a location of the user when the user provide the partial query via the computing device;

identify a query template based on the partial query, wherein the query template includes one or more template terms and an identifier of an entity category, and wherein the entity category corresponds to a group of entities that share one or more aspects in common;

generate a query suggestion based on the query template, wherein when generating the query suggestion, one or more of the processors are to:

identify multiple different entity aliases based on the entity category that corresponds to the group of entities, selecting, from the multiple different entity aliases, an entity alias for an entity of the group of entities based on the current location of the user when the user entered the partial query and one or more characters of the partial query, wherein the one or more characters follow the one or more template terms in the partial query, and include the one or more template terms and the entity alias in the query suggestion; and provide the query suggestion for presentation in response to the partial query.

14. The system of claim 13, wherein selecting the entity alias is further based on a popularity measure associated with the entity associated with the entity alias.

15. The system of claim 13, wherein in identifying the query template based on the partial query one or more of the processors are to:

determine that one or more terms in the partial query match the one or more template terms of the query template.

16. The system of claim 13, wherein identifying the query template is further based on a ranking of the query template relative to other query templates.

17. The method of claim 3, wherein selecting the entity alias is further based on the frequency of occurrence count of the entity alias relative to other frequency of occurrence counts corresponding to occurrences of the multiple different entity aliases in the previously identified queries.

18. The system of claim 13, wherein selecting the entity alias is further based on a frequency of occurrence count of the entity alias in previously identified queries.

19. The system of claim 18, wherein selecting the entity alias is further based on the frequency of occurrence count of the entity alias relative to other frequency of occurrence counts corresponding to occurrences of the multiple different entity aliases in the previously identified queries.

* * * * *